(12) United States Patent
Fanini et al.

(10) Patent No.: US 7,668,041 B2
(45) Date of Patent: Feb. 23, 2010

(54) APPARATUS AND METHODS FOR ACQUIRING SEISMIC DATA WHILE TRIPPING

(75) Inventors: Otto N. Fanini, Houston, TX (US); James C. Jackson, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 116 days.

(21) Appl. No.: 11/264,963

(22) Filed: Nov. 2, 2005

(65) Prior Publication Data

US 2006/0146646 A1 Jul. 6, 2006

Related U.S. Application Data

(63) Continuation-in-part of application No. 10/108,402, filed on Mar. 28, 2002, now Pat. No. 6,990,045.

(51) Int. Cl.
G01V 1/24 (2006.01)

(52) U.S. Cl. ............... 367/25; 367/27; 331/176; 368/159

(58) Field of Classification Search ............ 367/25, 367/27, 911; 368/159; 73/152.01–152.46; 331/176
See application file for complete search history.

(56) References Cited

U.S. PATENT DOCUMENTS

| | | | |
|---|---|---|---|
| 3,185,997 A | 5/1965 | Carlton et al. | |
| 3,260,112 A | 7/1966 | Godbey et al. | |
| 3,710,448 A | 1/1973 | Kimmel et al. | |
| 4,259,606 A * | 3/1981 | Vig ............ | 310/343 |
| 4,298,967 A | 11/1981 | Hawkins | |
| 4,320,473 A | 3/1982 | Smither et al. | |
| 4,563,757 A | 1/1986 | Decorps et al. | |
| 5,555,220 A | 9/1996 | Minto | |
| 5,585,556 A | 12/1996 | Petersen et al. | |
| 5,589,825 A | 12/1996 | Pomerleau | |
| 6,131,694 A | 10/2000 | Robbins et al. | |

(Continued)

FOREIGN PATENT DOCUMENTS

EP 0239464 B1 9/1987

(Continued)

OTHER PUBLICATIONS

Oscilloquartz. "OCXO 8607 BVA Oven Controlled Crystal Oscillator." Edition Apr. 2003.*

(Continued)

*Primary Examiner*—Scott A Hughes
(74) *Attorney, Agent, or Firm*—Madan & Sriram, P.C.

(57) ABSTRACT

A system for acquiring logging data comprises a controller for causing the generation of a signal in a formation surrounding a wellbore. The controller has a first clock for time-stamping a record of the generated signal. A receiver is deployed in the wellbore and is adapted for detecting the signal. A second clock comprises a double-oven surrounding a crystal oscillator. A controller is operatively coupled to the double-oven to maintain the crystal oscillator temperature substantially at the crystal oscillator turnover temperature. The second clock is synchronized with the first clock before deployment in the wellbore, and the receiver references the second clock in order to record a time-stamp associated with the detected signal.

10 Claims, 5 Drawing Sheets

U.S. PATENT DOCUMENTS

| | | | |
|---|---|---|---|
| 6,378,627 B1 | 4/2002 | Tubel et al. | |
| 6,424,595 B1 | 7/2002 | Chenin | |
| 6,606,009 B2 * | 8/2003 | Gunawardana et al. | 331/176 |
| 6,614,718 B2 | 9/2003 | Cecconi et al. | |
| 6,621,361 B1 * | 9/2003 | Fry | 331/69 |
| 6,662,899 B2 | 12/2003 | Norris et al. | |
| 6,859,110 B2 | 2/2005 | Satoh | |
| 6,912,465 B2 * | 6/2005 | Collins et al. | 702/6 |
| 6,976,392 B2 * | 12/2005 | DiFoggio et al. | 73/152.46 |
| 7,046,584 B2 * | 5/2006 | Sorrells et al. | 368/159 |
| 7,116,182 B2 * | 10/2006 | Varsamis et al. | 331/176 |
| 7,230,543 B2 * | 6/2007 | Minto et al. | 340/854.3 |
| 2002/0060952 A1 * | 5/2002 | Cecconi et al. | 367/25 |
| 2003/0024761 A1 | 2/2003 | Tashiro et al. | |
| 2003/0043055 A1 | 3/2003 | Schultz et al. | |
| 2006/0044939 A1 | 3/2006 | Shah et al. | |

FOREIGN PATENT DOCUMENTS

| | | |
|---|---|---|
| EP | 0939195 B1 | 9/1999 |

OTHER PUBLICATIONS

Willrodt, Marv. "Quartz Crystal Oscillators." Hewlett Packard, Bench Briefs, vol. 13, No. 3, Jul.-Aug. 1973.*

Ho, et al. "A Fast Warmup Oscillator for the GPS Receiver." Prodceedings of the 31$^{st}$ Annual Frequency Control Symposium, 1977.*

* cited by examiner

APPARATUS AND METHODS FOR ACQUIRING SEISMIC DATA WHILE TRIPPING

CROSS REFERENCES TO RELATED APPLICATIONS

This application is a Continuation-In-Part of U.S. patent application Ser. No. 10/108,402 filed Mar. 28, 2002 now U.S. Pat. No 6,990,045 and published as US 2003-0185099 A1 on Oct. 2, 2003, which is incorporated herein by reference.

BACKGROUND OF THE INVENTION

1. Field of the Invention

The present invention is related to the field of geophysical exploration and more specifically to apparatus and methods of using a seismic receiver in a drill string in a wellbore to acquire seismic data while tripping the drill string from the wellbore.

2. Description of the Related Art

In drilling a borehole to recover oil from the earth, it is often helpful to turn or steer the downhole drill bit toward or away from subterranean targets. To facilitate this geophysical steering, drillers need to know drill bit location on the seismic section. The location of targets ahead of the bit is also required, as well as some warning or indication of drilling hazards such as over-pressured formations or thin, shallow gas intervals. Surface seismic surveys generally include this information, but resolution and depth location is poor because surface seismic surveys are time based (rather than depth based). For example, to determine the depth of a reflection, a speed of sound for the formation must be known. Consequently, these systems require depth calibration to accurately determine locations of target horizons or drilling hazards. Traditionally, this calibration has been provided by either offset well sonic data or wireline checkshot data in the current well. Offset data is often inadequate however due to horizontal variations in stratigraphy between wells.

During surface seismic surveys, a plurality of seismic sources and seismic receivers are placed on the surface of the earth. The seismic sources are triggered in a predetermined sequence, resulting in the generation of seismic waves. These seismic waves travel downward through the earth until reflected off some underground object or change in rock formation. The reflected seismic waves then travel upward and are detected at the seismic receivers on the surface. One or more clocks at the surface measure the time from generation of the seismic waves at each source to the reception of the seismic waves at each receiver. This gives an indication of the depth of the detected object underground. However, the exact speed of sound for these seismic waves is unknown, and thus, the exact depth of the detected object is also unknown. To more closely measure the exact speed of sound, a "wireline checkshot" may be used to calibrate depth measurements. During a "wireline checkshot," a receiver on a "wireline" is lowered a known distance into an already-drilled borehole. A surface seismic source is then triggered and the time is measured for the seismic wave to travel to the wireline receiver. Because the depth of the wireline receiver is known, an average interval velocity indicating the average speed of the seismic wave can be determined with some degree of accuracy. Wireline checkshots, however, require removing the bit out of the hole, commonly known as tripping, and are often prohibitively expensive.

Systems and tools are known in the art for detecting and storing seismic signals downhole for retrieval and processing on the surface. U.S. Pat. No. 5,555,220 to Minto, assigned to the assignee of this application and incorporated herein by reference, describes a seismic receiver deployed to the bottom of a drill string on a slick line for taking seismic survey data. Seismic data is received and stored and the receiver is retrieved to the surface. A clock in a surface controller is synchronized with a clock in the deployed receiver. The source data is time-stamped using the surface clock. The received data is time-stamped using the downhole clock. The accuracy of the resulting seismic profile is dependent upon the accurate synchronization of the clocks. The downhole clock, in particular, is susceptible to drift caused by substantial changes in temperature found in the downhole environment.

Typical deployment times of such tools is 12-48 hours. This fact translates into a need for clock stability better than $1 \times 10^{-8}$ over the deployment time. Common downhole clocks that use piezoelectric crystal oscillators tend to drift with temperature and age, and rarely exceed a stability of $1 \times 10^{-7}$. Such clocks commonly use a single oven to control the oscillator temperature. As such, the downhole clock drifts out of synchronization with the surface clock, causing unacceptable degradation of the output seismic profile data.

There is a demonstrated need for an improved clock that is resistant to operationally-induced error and drift for use in downhole systems including downhole seismic systems.

SUMMARY OF THE INVENTION

In one aspect, a system for acquiring logging data comprises a controller for causing the generation of a signal in a formation surrounding a wellbore. The controller has a first clock for time-stamping a record of the generated signal. A receiver is deployed in the wellbore and is adapted for detecting the signal. A second clock comprises a double-oven surrounding a crystal oscillator. A controller is operatively coupled to the double oven to maintain the crystal oscillator temperature substantially at the crystal oscillator turnover temperature. The second clock is synchronized with the first clock before deployment in the wellbore, and the receiver references the second clock in order to record a time-stamp associated with the detected signal.

In another aspect, an ovenized clock for use in a wellbore comprises a downhole tool for housing the ovenized clock. A first temperature controlled oven has a crystal oscillator disposed therein. The crystal oscillator has a turnover temperature greater than a downhole operating temperature. A second temperature controlled oven surrounds the first temperature controlled oven. A controller is operatively coupled to and controls the first temperature controlled oven and the second temperature controlled oven to maintain the crystal oscillator substantially at the turnover temperature.

In another aspect, a method for acquiring logging data comprises generating a signal in a formation surrounding a wellbore. A record of the signal is stored in a medium using a first clock to obtain a time-stamp relating to the generated signal. The generated signal is detected with a receiver in the wellbore. A double-oven clock is deployed in data communication with the receiver. The double-oven clock is suitable for providing a time-stamp to the receiver. The double-oven clock is substantially synchronized with the first clock.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description, taken in conjunction with the accompanying drawings, in which like elements have been given like numerals, wherein.

DESCRIPTION OF EMBODIMENTS

Figure 1:
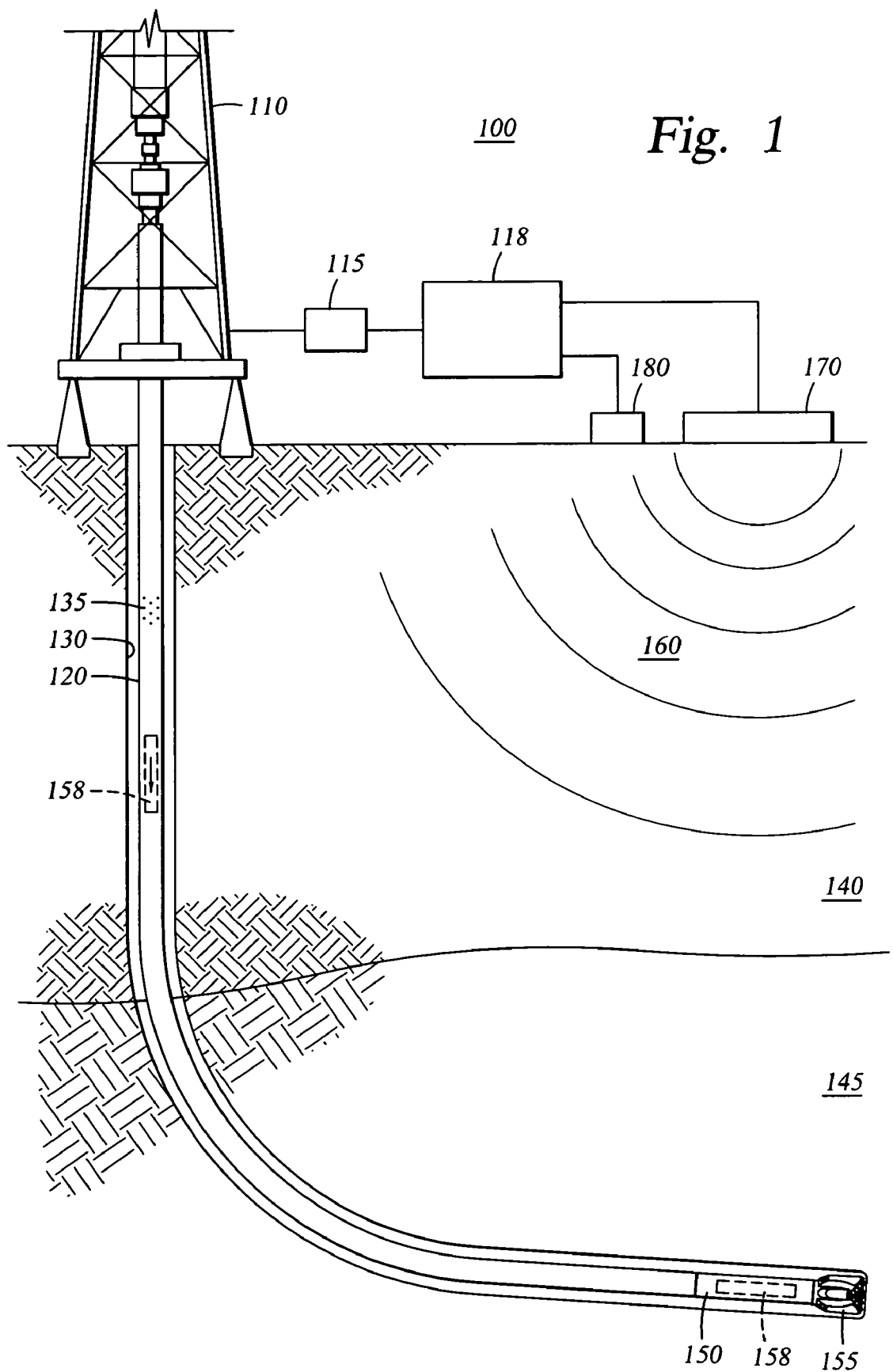
FIG. 1 is a schematic diagram of a seismic acquisition system for use in one embodiment of the present invention.

Referring to FIG. 1, a system 100 according to the present invention includes a derrick 110 with an attached drillstring 120. A drill bit 155 creates a well bore 130 through the surrounding formation 140, which may also include formation boundaries corresponding to, for example, an over-pressurized zone 145. A seismic receiver 158 with appropriate seismic sensors is inserted into the drillstring 120 and falls by gravity to a landing sub 150 near the drill bit 155. Alternatively, the seismic receiver 158 may be deployed using the drilling fluid 135 to effectively pump the receiver 158 to the landing sub 150. The seismic receiver 158 receives seismic signals 160 from a seismic source 170, such as a mechanical vibrator, located at the surface. The use of a mechanical vibrator is exemplary only, as the system may be either land or marine-based, and is not seismic source-type specific. For example, an offshore system may include an air gun array, either hung from an offshore platform or located near a service boat or anchored buoy. The seismic source 170 thus provides a suitable vertical seismic profiling quality source signal.

Also located at the surface is a depth indicator 115 to measure the depth of the drillstring 120. In embodiments where the seismic receiver 158 is deployed by wireline, the depth indicator 115 may be of the type that determines the depth of the wireline tool within the welbore. The depth indicator signals are transmitted to a surface controller 118 where they are time stamped and stored in memory.

The controller 118 is in data communication with the seismic source 170 and controls the generation of seismic signals. The controller 118 may reside at or near the location of the borehole or may be located remote from the borehole. The term "controller" as used in this disclosure and the appended claims is intended to mean any unit which provides the functions, including but not limited to, of controlling the generation of seismic signals and recording a record of their generation. In the example depicted, the controller 118 contains circuitry having processing capability, such as one or more microprocessors, as well as memory storage to allow the programming of instructions to control the generation of seismic signals. Alternatively, the memory storage may also be suitable to the storage of data representing the generated seismic signals, their character (period, amplitude, time-stamp, signature traits, near-field sensor readings, etc.) and other associated information. The controller 118 comprises a clock (not separately shown), which may be referenced to provide time coding associated with the transmitted source signal. In one embodiment, the controller clock is a real-time clock. Such a clock may be synchronized with Global Positioning System (GPS) signals. The actual connection between the controller 118 and the seismic source 170 may be a hard-wire, radio frequency (RF), infrared (IR) or any other suitable communication system connection. Those skilled in the art will appreciate the many different configurations of controllers that could be used, each of which is deemed a "controller."

A near-field sensor 180 is located near the source 170 and is used to record the acoustic signature of the source 170. The output of sensor 180 is transmitted to the surface controller 118 where it is time stamped and stored in memory. The memory used for storing data in the surface processor may be internal random access memory, magnetic storage, optical storage, or any combination of these. Alternatively, output from sensor 180 may be transmitted to the controller 118, time-stamped and forwarded via a computer communications system (not shown), such as a computer network, asynchronous connection or satellite transmission, to a remote location (not shown) for storage.

Figure 2:
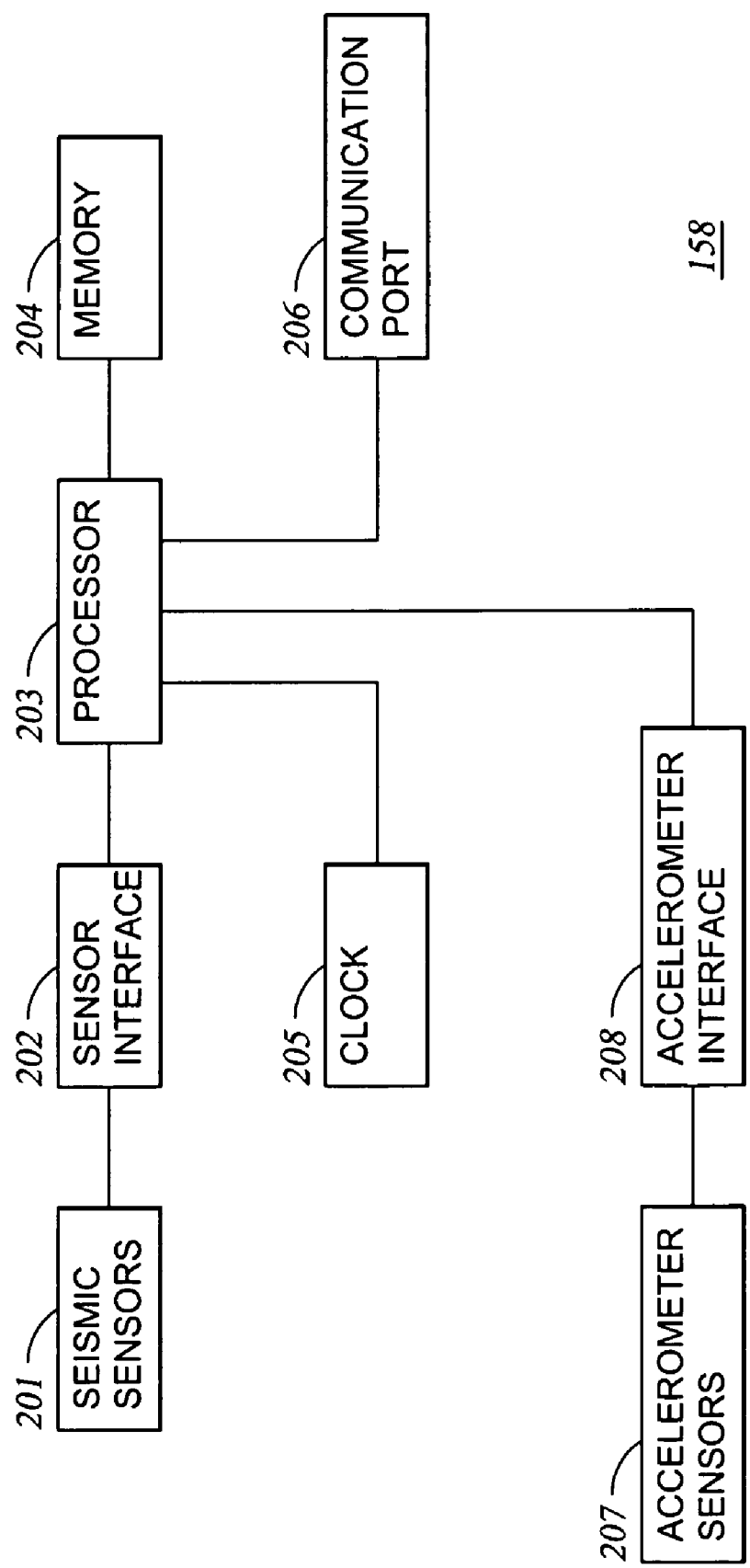
FIG. 2 is a block diagram of a seismic receiver for use in one embodiment of the present invention.

Referring to FIG. 2, the seismic receiver 158 may include a combination of sensors 201 such as hydrophones and geophones along with suitable sensor interface circuitry 202, a processor 203 and memory 204 for storage of programmed instructions and storage of received seismic data. A clock circuit 205 is also included in the receiver 158 to provide time stamps associated with the received seismic signals. The surface time clock in controller 118 and the receiver clock 205 are synchronized at the surface before deploying the seismic receiver 158 into the wellbore 130. A communications port 206 is included to facilitate the downloading of program instructions to memory 204 and the uploading stored seismic data (along with associated time stamps) to a surface system such as surface processor 118. Those skilled in the art will appreciate that the communications port 206 may operate by any number of techniques well-appreciated in the art, such as serial or parallel computer transmission, RF transmission, IR transmission or the like.

The receiver 158 may be powered by any number of techniques, including via batteries (not shown). Sub 150 is adapted to physically latch to the landed receiver 158 to substantially prevent the receiver 158 from bouncing as the drill string 120 is tripped from the wellbore 130. It will be appreciated that in some embodiments, such as where the receiver 158 is deployed as part of a wireline tool, the sub 150 may not be required.

Figure 3:
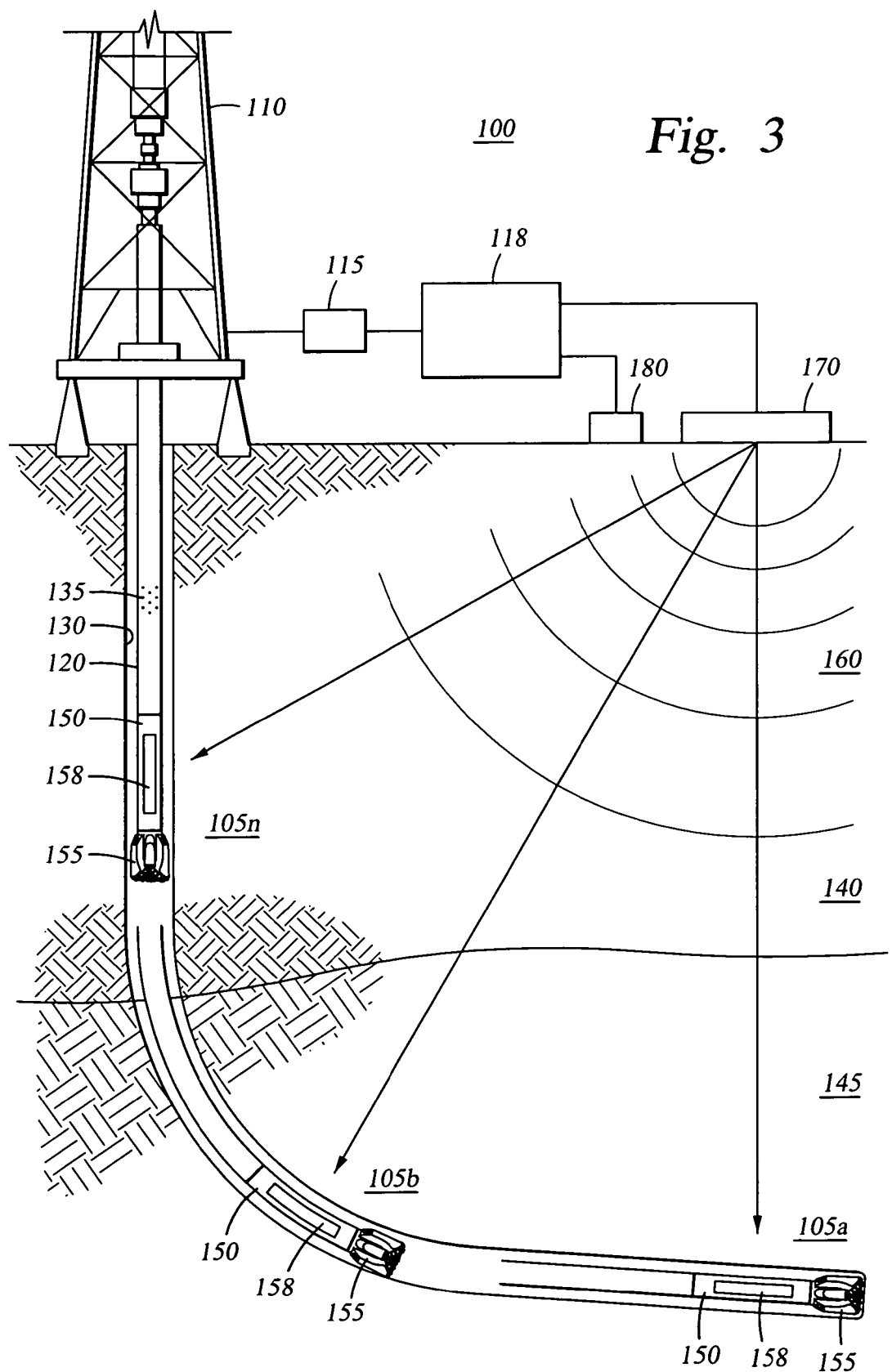
FIG. 3 is a schematic of a seismic acquisition system for use in one embodiment of the present invention.

In operation, shown in FIG. 3, the seismic receiver has been conveyed to the bottom of the drill string 120 and is latched into the landing sub 150 prior to tripping the drill string 120 out of the wellbore 130 and is located at position 105a. In one embodiment, the seismic receiver is programmed at the surface to turn on the seismic receiving sensors 201 after a predetermined time delay. The time delay is operator selected to allow the receiver 158 to reach the landing sub 150 before activating the seismic sensors 201. After the programmed time delay, the surface processor 118 is initiated to begin to cycle the surface source 170 generating seismic signals 160 at predetermined intervals. The interval between signals is selected, depending on receiver depth, in order to prevent overlap of successive signals.

In one embodiment, the receiver 158 is programmed to take samples during predetermined time windows selected by the operator before deployment. The surface processor is programmed to transmit during these predetermined time windows. The predetermined time windows are selected to approximately correlate with the normal tripping speed so that the sampling time windows will occur at desired sample locations in the wellbore. The operator stops motion of the drill string during these windows to provide a relatively low noise environment for the seismic sensors 201. The receiver processor 203 samples, time stamps, and stores the detected signals during the predetermined window in memory 204. After the initial on-bottom detection, the drill string 120 tripping process begins. The tripping is stopped at the predetermined locations in the wellbore 130 such as location 105b, 105n and the drill string 120 is held stationary during the time sample windows. While three locations of interest are shown in FIG. 3, any number of locations of interest may be chosen. The surface processor 118 cycles the source 170 during each sample window. The near-field sensor 180 detects each generated source signal and transmits the detected signal to the surface processor 118 where it is time stamped and stored in memory in the surface processor 118. At the end of the tripping process, the seismic receiver 158 is retrieved from the landing sub 150. The time-stamped seismic signals are transmitted via the communications port 206 to the surface processor where they are processed with the near-field signals and the depth data, according to techniques known in the art, to provide an improved seismic map of the downhole formation.

In another embodiment, the receiver 158 has at least one accelerometer 207 mounted in the receiver 158 to sense movement of the drill string 120, see FIG. 2. Signals from accelerometer 207 are conditioned by interface circuits 208 and fed to processor 203. Accelerometer 207 is powered continuously from the time the seismic receiver 158 is inserted into the wellbore until the receiver is returned to the surface after the seismic data acquisition process. These accelerometer signals are used to switch the seismic receiving cycle on and off in receiver 158. When the drill string 120 is positioned at a location where it is desirable to take seismic data, such as 105a, 105b, and 105n in FIG. 3, the drill string 120 is held stationary at the surface. The accelerometer generated signals are used by the processor 203 to determine that the drill-string 120 has stopped moving and initiates the taking of seismic data. The processor is preprogrammed to receive and store data for a predetermined period of time sufficient to receive several source signals. The source 170 is activated as described above and data is taken and stored from the near-field sensor 180 and the depth sensor 115 as described previously. As before, the downhole received and stored data is transferred to the surface processor 118 when the seismic receiver 158 is returned to the surface.

In yet another embodiment, an acoustic source (not shown) is coupled to the drill-string at the surface when the drill-string 120 is stopped to take seismic data. The acoustic source transmits a coded signal through the drill-string 120 that is detected and decoded by the seismic receiver 158. The coded signal can be used to initiate the taking of data by the receiver 158. Such acoustic systems are known in the art and are not discussed here further.

Figure 4:
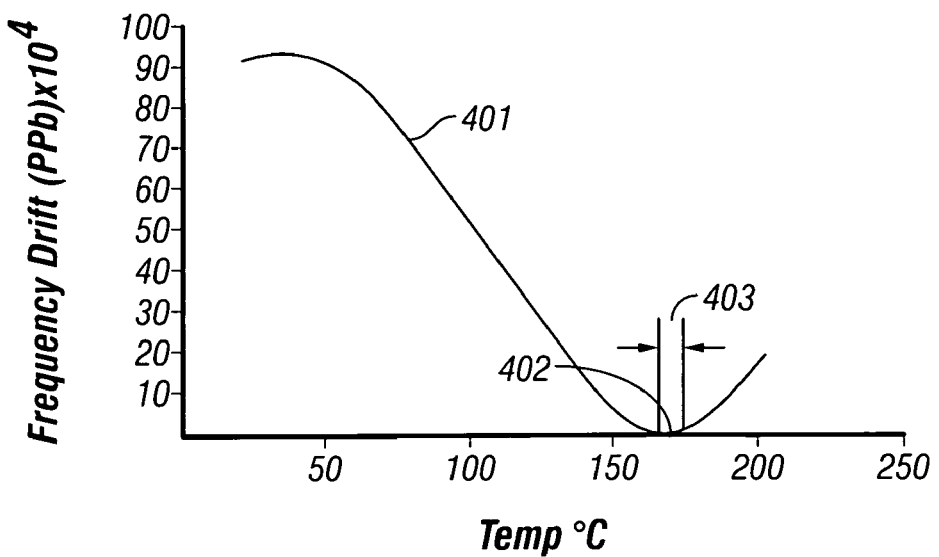
FIG. 4 is a sketch showing the frequency drift of an SC cut crystal oscillator as a function of temperature.
Figure 5:
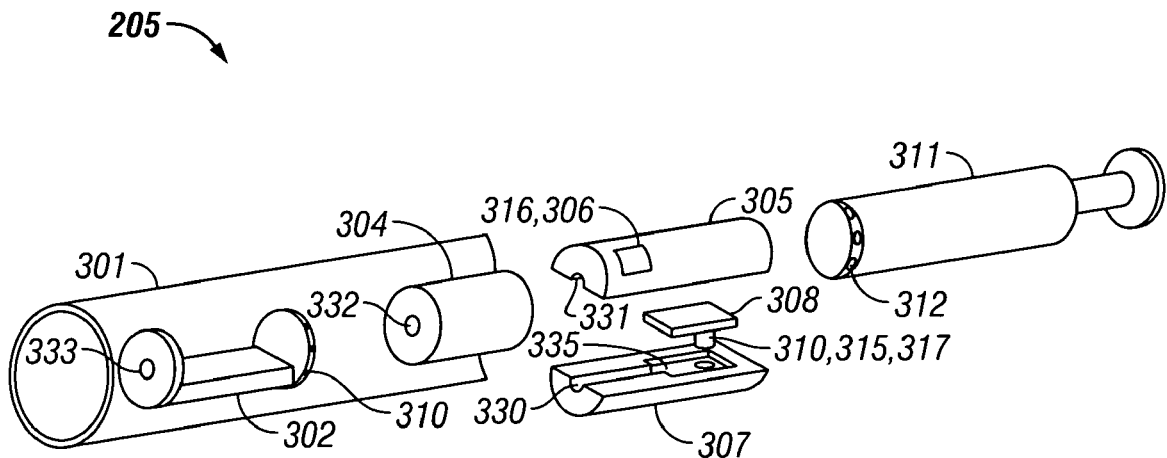
FIG. 5 shows an exploded view of an embodiment of a downhole, double oven clock of the present invention.
Figure 6:
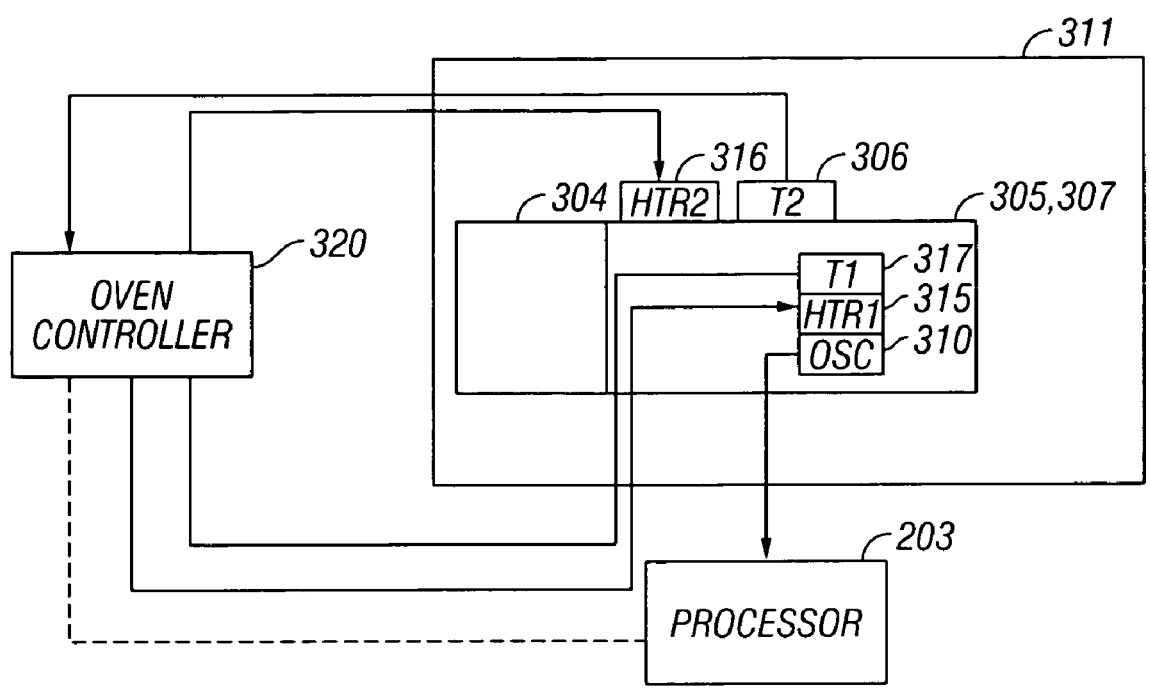
FIG. 6 is a functional block diagram of a downhole, double oven clock of the present invention.

In one embodiment, downhole clock 205 comprises a double-oven contained crystal oscillator, see FIGS. 4-6, that provides sufficient stability for operation in seismic receiver 118. It is known in the art, that the oscillating frequency of a crystal oscillator commonly varies with temperature, see FIG. 4. There commonly exist temperatures, called turnover temperatures, where the frequency drift is substantially zero, or at least very small for changes in temperature about the turnover temperature. The exact temperature at which the turnover point occurs is a function of the crystal's cut geometry, such as, for example, the angle at which the specific crystal oscillator was cut from the original quartz stone. FIG. 4 shows an example of such a curve 401 of frequency drift versus temperature for an SC cut crystal oscillator used in the present invention. As one skilled in the art will appreciate, the SC cut crystal is cut at an oblique angle with respect to two crystal axes (doubly rotated). Such crystals are commercially available. The turnover temperature 402 is approximately 170° C. As seen in FIG. 4, by maintaining the oscillator within a temperature range 403 about turnover temperature 402, the frequency drift of a crystal oscillator may be controlled at a level suitable for downhole use. The drift versus temperature and the turnover frequency may be determined by those skilled in the art without undue experimentation.

Operating temperature for common downhole tools is about 150° C. The crystal oscillator of FIG. 4 provides a turnover temperature above the operating temperature. By providing a thermal management system to maintain the oscillator operating temperature above the tool operating temperature, a stable oscillator may be obtained with heating elements alone. To obtain the stability required, a double-oven configuration, such as, for example, that described below, is used.

FIG. 5 shows an exploded view of clock 205 that comprises a double-oven crystal oscillator system that provides a clock stability of about $10^{-8}$ over a 36 hour downhole deployment (a clock drift rate of less than 10 microseconds per day). Crystal oscillator 310 is an SC cut crystal having an upper turnover temperature of about 170° C. Attached to the outer shell of oscillator 310 are electric heater 315 and temperature sensor 317 and this combination comprises a first oven around oscillator 310. Heater 315 and temperature sensor 317 are connected to oven controller 320 (see FIG. 6) and act cooperatively to maintain the oscillator temperature within a predetermined range around the upper turnover temperature.

Oscillator 310 is mounted on printed circuit board(PCB) 308 that provides drive power and interface circuitry to oscillator 310. The oscillator/PCB assembly is mounted in pocket 335 in lower shell 307. Upper shell 305 assembles to lower shell 307. Electric heater 316 is attached to the outer periphery of shells 305 and 307. Temperature sensor 306 is attached to outer shell 305. Upper shell 305, lower shell 307, heater 316 and temperature sensor 306 comprise a second oven surrounding the first oven. Heater 316 and temperature sensor 306 are connected to oven controller 320 and act cooperatively with oven controller 320 to maintain the outer shells 305, 306 at a temperature about 10° C. less than the turnover temperature. The combined outer shells 305, 307 are attached to thermal isolator 304 and fit inside of thermal insulating flask 311. Insulating flask 311 is a metallic Dewar-type flask that substantially isolates the clock module from external temperature variations and thermal perturbations that may be transferred into flask 311. Bulkhead 310 attached to insulator 302 captures the clock system in flask 311 and acts to isolate the clock system from external perturbations that may be conducted into flask 311. Electrical connections are established between PCB 308 and the other devices in the downhole system through wire ways 331, 330, 332, 333.

Each controlled temperature heater forms a separate substantially isothermal layer surrounding the clock oscillator. The two controlled isothermal layers form a dual-oven system with each isothermal layer effectively constituting an oven. The outer isothermal layer of the upper and lower shells, 305, 307 and heater 316 acts to control the larger external temperature perturbations coming from the borehole environment and/or internal heat generation from the other devices in receiver 158, and thus isolates the inner isothermal layer which provides suitable fine control of the oscillator temperature.

In one embodiment, see FIG. 6, oven controller 320 is substantially self contained and includes, internally, suitable circuitry for setting and controlling the heater temperatures. As one skilled in the art will appreciate, oven controller 320 may be configured in analog and/or digital circuitry without undue experimentation. Alternatively, downhole processor 203, see FIG. 2, may be programmed to interface and provide suitable commands to oven controller 320 to set and control the heater temperatures.

In one embodiment, oscillator 310, see FIG. 6, may be calibrated versus temperature before installation in clock 205. In operation, temperature sensors T1 and T2, see FIG. 6, provide temperature measurements that are stored in a memory (not separately shown) of downhole processor 203 along with the associated time. This data may be processed by downhole processor 203 to further correct the time signal of clock 205. Alternatively, the temperature and time stored data may be uploaded to surface processor 118 for post-processing and correction of the time data based on the prior calibration.

The foregoing description is directed to particular embodiments of the present invention for the purpose of illustration and explanation. It will be apparent, however, to one skilled in the art that many modifications and changes to the embodiment set forth above are possible. It is intended that the following claims be interpreted to embrace all such modifications and changes.

What is claimed is:

1. A system for obtaining information about a formation, comprising:
    a controller having a first clock for time-stamping a record of a signal generated in the formation; and
    a receiver configured to be deployed in the wellbore and configured to detect the signal from the formation;
    a second clock comprising a first oven surrounding a crystal oscillator and a first temperature sensor configured to measure temperature of the crystal oscillator downhole;
    a second oven surrounding the first oven and a second sensor configured to measure temperature in the second oven;
    a downhole controller configured to maintain the crystal oscillator temperature substantially at a crystal oscillator turnover temperature in response to the temperature measurements of the first and second sensors;
    wherein, the second clock is synchronized with the first clock before deployment of the second clock in the wellbore, and wherein the receiver is configured to reference the second clock to time-stamp a record associated with the detected signal, and wherein the temperature measurements over time are used to correct the time of the second clock.

2. The system of claim 1 wherein the second clock has a drift rate of less than 10 microseconds per day.

3. The system of claim 1 further comprising a thermal insulating container surrounding the double oven.

4. The system of claim 3, wherein the insulating container is a Dewar flask.

5. The system of claim 1 wherein the signal is a seismic signal and the receiver is a seismic receiver.

6. The system of claim 1 wherein the receiver is deployable in the wellbore for detecting the signal while tripping a drill string out of the wellbore.

7. The system of claim 1 wherein the receiver is configured to be integrally mounted in a drill string for receiving the signal while drilling.

8. The system of claim 1, wherein the crystal oscillator comprises an SC cut crystal.

9. The system of claim 1, wherein the crystal oscillator comprises a turnover temperature greater than 150° C.

10. The system of claim 1, wherein the downhole controller comprises a processor and a memory configured to store a temperature of the crystal oscillator measured in the wellbore.

* * * * *

UNITED STATES PATENT AND TRADEMARK OFFICE
CERTIFICATE OF CORRECTION

| | | |
|---|---|---|
| PATENT NO. | : 7,668,041 B2 | Page 1 of 1 |
| APPLICATION NO. | : 11/264963 | |
| DATED | : February 23, 2010 | |
| INVENTOR(S) | : Otto N. Fanini et al. | |

It is certified that error appears in the above-identified patent and that said Letters Patent is hereby corrected as shown below:

Column 7, claim 1, line 34, delete "and";

Column 7, claim 1, line 35, delete "the wellbore", insert --a wellbore--;

Column 8, line 3, delete "oven;", insert --oven; and--;

Column 8, line 8, delete "wherein, the", insert --wherein the--; and

Column 8, claim 3, line 18, delete "double", insert --second--.

Signed and Sealed this

Thirteenth Day of July, 2010

David J. Kappos
*Director of the United States Patent and Trademark Office*